(12) United States Patent
Chen et al.

(10) Patent No.: US 10,516,342 B1
(45) Date of Patent: Dec. 24, 2019

(54) THREE ARM RECTIFIER AND INVERTER CIRCUIT

(71) Applicant: National Chung-Shan Institute of Science and Technology, Taoyuan (TW)

(72) Inventors: Kun-Feng Chen, Taoyuan (TW); Jun-Hao Chen, Changhua County (TW); Hsu-Pin Yang, New Taipei (TW)

(73) Assignee: National Chung-Shan Institute of Science and Technology, Taoyuan (TW)

( * ) Notice: Subject to any disclaimer, the term of this patent is extended or adjusted under 35 U.S.C. 154(b) by 0 days.

(21) Appl. No.: 16/215,472

(22) Filed: Dec. 10, 2018

(51) Int. Cl.
*H02M 5/458* (2006.01)
*H02M 1/42* (2007.01)
*H02J 9/06* (2006.01)
*H02M 1/00* (2006.01)

(52) U.S. Cl.
CPC ....... *H02M 5/4585* (2013.01); *H02M 1/4233* (2013.01); *H02J 2009/063* (2013.01); *H02M 2001/0022* (2013.01)

(58) Field of Classification Search
CPC .. H02M 1/4225; H02M 1/425; H02M 5/4585; H02M 2001/0022; H02M 1/4233; H02J 9/062; H02J 2009/063
See application file for complete search history.

(56) References Cited

U.S. PATENT DOCUMENTS

| | | | | |
|---|---|---|---|---|
| 5,790,391 A | * | 8/1998 | Stich | H02J 9/062 307/64 |
| 7,239,043 B2 | * | 7/2007 | Taimela | H02M 1/4208 307/66 |
| 2001/0001535 A1 | * | 5/2001 | Johnson, Jr. | H02J 9/061 323/282 |
| 2001/0026460 A1 | * | 10/2001 | Ito | H02M 5/4585 363/34 |
| 2008/0019155 A1 | * | 1/2008 | Morishima | H02J 9/062 363/37 |
| 2013/0235625 A1 | * | 9/2013 | Yamada | H02M 5/4585 363/37 |
| 2013/0294124 A1 | * | 11/2013 | Fujita | H02M 7/04 363/84 |
| 2014/0104896 A1 | * | 4/2014 | Tallam | H02M 5/4585 363/37 |
| 2014/0104897 A1 | * | 4/2014 | Li | H02J 9/062 363/37 |
| 2014/0204642 A1 | * | 7/2014 | Banno | H02M 5/27 363/131 |

(Continued)

*Primary Examiner* — Fred E Finch, III
(74) *Attorney, Agent, or Firm* — Winston Hsu

(57) ABSTRACT

A three arm rectifier and inverter circuit is provided. The three arm rectifier and inverter circuit includes an input end, a rectifier circuit and an inverter circuit. The input end is utilized for inputting an input voltage and an input current. The rectifier circuit includes a low frequency switching arm. The low frequency switching arm is coupled to the input end for receiving the input voltage and the input current and generating a trigger signal. The inverter circuit includes a full bridge switch. The full bridge switch is coupled to the low frequency switching arm for receiving the trigger signal and adjusting an output voltage.

8 Claims, 7 Drawing Sheets

(56) References Cited

U.S. PATENT DOCUMENTS

| | | | |
|---|---|---|---|
| 2014/0346877 A1* | 11/2014 | Fujita | H02M 5/297 |
| | | | 307/45 |
| 2015/0138850 A1* | 5/2015 | Pan | H02M 1/4208 |
| | | | 363/37 |
| 2015/0256095 A1* | 9/2015 | Ohta | H02M 7/4826 |
| | | | 363/37 |
| 2016/0006295 A1* | 1/2016 | Yang | H02J 9/062 |
| | | | 307/66 |
| 2016/0065056 A1* | 3/2016 | Chen | H02M 1/4233 |
| | | | 363/89 |
| 2016/0261214 A1* | 9/2016 | Greetham | H02P 6/14 |

* cited by examiner

THREE ARM RECTIFIER AND INVERTER CIRCUIT

BACKGROUND OF THE INVENTION

1. Field of the Invention

The present invention relates to a rectifier and inverter circuit, and more specifically to a three arm rectifier and inverter circuit.

2. Description of the Prior Art

A rectifier and inverter circuit is often used in an uninterruptible power system. The most commonly used rectifier and inverter circuit architectures for the uninterruptible power system are shown in FIG. 1 and FIG. 2. FIG. 1 is a schematic diagram of a conventional rectifier and inverter with half-bridge scheme according to the prior art. As shown in FIG. 1, the conventional half-bridge rectifier and inverter includes a rectifier arm A1, an inverter arm B1 and a capacitor arm C1. However, for a 220 Vac system, the direct current (DC) link voltage need rise to 800V, and the load with a asymmetric positive and negative half cycle current may also cause an imbalance of two divided capacitor voltages.

Further, please refer FIG. 2. FIG. 2 is a schematic diagram of a conventional rectifier and inverter with no-bridge scheme according to the prior art. As shown in FIG. 2, the conventional no-bridge rectifier and inverter includes a rectifier arm A2, an inverter arm B2, a capacitor arm C2 and a synchronous switch D2. The voltage step up ratio of the conventional rectifier and inverter shown in FIG. 2 is merely one half of the voltage step up ratio of the conventional rectifier and inverter shown in FIG. 1. Besides, the diode of the rectifier arm A2 can be a faster diode for higher switching speed and low conduction voltage drop. However, since the conventional rectifier and inverter shown in FIG. 1 and FIG. 2 are both half-bridge architectures, there still exists the high conduction current and imbalance of capacitor voltage problems.

In short, the conventional rectifiers and inverters shown in FIG. 1 and FIG. 2 employ the half-bridge architectures, leading to the high conduction current and imbalance of capacitor voltage problems. Moreover, for a 220 Vac system, since the DC link voltage need rise to above 800V, power components with high voltage are required, resulting in practically difficult in practical applications. Thus, there is a need for improvement of the prior art.

SUMMARY OF THE INVENTION

Based on the aforementioned disadvantages of the prior art, it is therefore a primary objective of the present invention to provide a three arm rectifier and inverter circuit with the low frequency switching arm and the full bridge switch and capable of improving the efficiency of the mains to load power supply and reducing inverter cost, so as to solve the above mentioned problems.

In order to achieve the aforementioned objective, the present invention provides a three arm rectifier and inverter circuit, comprising: an input end for inputting an input voltage and an input current; a rectifier circuit comprising a low frequency switching arm, wherein the low frequency switching arm is coupled to the input end for receiving the input voltage and the input current and generating a trigger signal; and an inverter circuit comprising a full bridge switch, wherein the full bridge switch is coupled to the low frequency switching arm for receiving the trigger signal and adjusting an output voltage.

According to one embodiment of the present invention, the full bridge switch comprises: a rectifier arm, wherein the rectifier arm is coupled to the low frequency switching arm for receiving the trigger signal and adjusting the input voltage and the input current; and an inverter arm, wherein a first terminal of the inverter arm is coupled to the rectifier arm and a second terminal of the inverter arm is coupled to a load, for adjusting the output voltage.

According to one embodiment of the present invention, the three arm rectifier and inverter circuit of claim 1, further comprising a first inductor, wherein a first terminal of the first inductor is coupled to the input end and a second terminal of the first inductor is coupled to the low frequency switching arm; and a second inductor, wherein a first terminal of the second inductor is coupled to a full bridge switch and a second terminal of the second inductor is coupled to a load.

According to one embodiment of the present invention, after receiving the input voltage and the input current, the low frequency switching arm performs an upper arm trigger operation during a positive half cycle and performs a lower arm trigger operation during a negative half cycle.

According to one embodiment of the present invention, the rectifier circuit comprises a first current control circuit, wherein the first current control circuit comprises a feed forward control signal, the feed forward control signal utilizes a normal value and a disturbance value of the input voltage to eliminate a first disturbance of the low frequency switching arm; and a first voltage control circuit, wherein the first cur voltage control circuit utilizes a first direct current voltage controller to receive a difference between a direct current voltage command and a direct current voltage feedback value to generate an input current amplitude command, wherein first voltage control circuit generates an input current command by multiplying the input current amplitude command with a synchronous sinusoidal signal.

According to one embodiment of the present invention, the inverter circuit comprises: a second current control circuit, wherein the second current control circuit comprises a feed forward voltage signal and a feed forward current signal, the feed forward voltage signal utilizes an output voltage command, a normal value of the input voltage and a disturbance value of the input voltage to eliminate a second disturbance of the full bridge switch, and the feed forward current signal is produced by multiplying an input current amplitude command with a synchronous sinusoidal signal and passed through an inductor with an angular frequency to eliminate a third disturbance of in the full bridge switch.

According to one embodiment of the present invention, the inverter circuit comprises: a second voltage control circuit, wherein the second cur voltage control circuit comprises a root mean square value control circuit and the root mean square value control circuit 315 calculates a root mean square value of the output voltage.

According to one embodiment of the present invention, the root mean square value is compared to a root mean square value command and the comparison result is provided to a second direct current voltage controller, the second direct current voltage controller receives the comparison result and accordingly generates an amplitude correction command for correcting an original amplitude command to obtain a voltage amplitude command, and the voltage amplitude command is multiplied with a synchronous sinusoidal signal to obtain an instantaneous voltage command.

According to one embodiment of the present invention, the inverter circuit comprises: a third direct current voltage controller, where the third direct current voltage controller receives a difference between an instantaneous voltage command and a direct current feedback value and accordingly generates an output current compensation command.

The above summary and the following detailed description and accompanying drawings, all in order to further illustrate the present invention to achieve the intended purpose are taken, means and effects. Such other objects and advantages of the invention will be set forth in the subsequent description and the accompanying drawings.

These and other objectives of the present invention will no doubt become obvious to those of ordinary skill in the art after reading the following detailed description of the preferred embodiment that is illustrated in the various figures and drawings.

DETAILED DESCRIPTION

The following illustrates specific embodiments of the present invention, and those skilled in the art can readily understand advantages and efficacy of the present invention accordingly.

Figure 1:
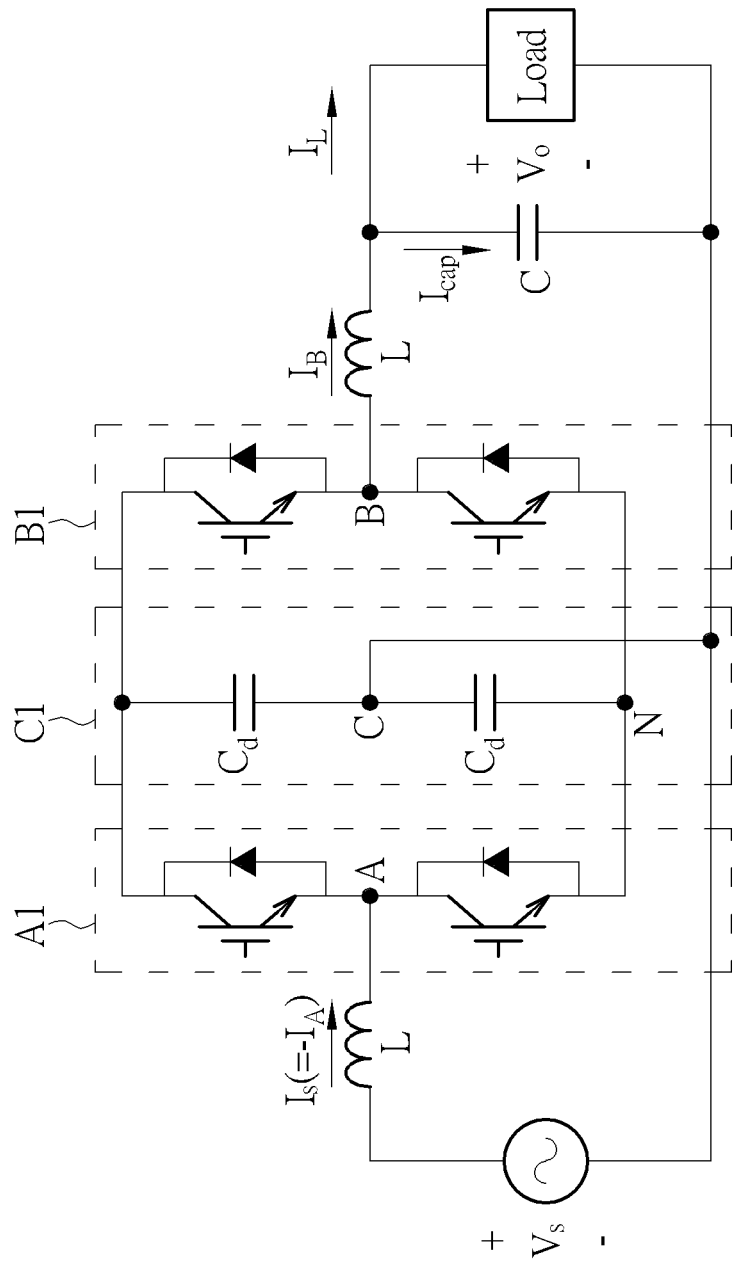
FIG. 1 is a schematic diagram of a conventional rectifier and inverter with half-bridge scheme according to the prior art.
Figure 2:
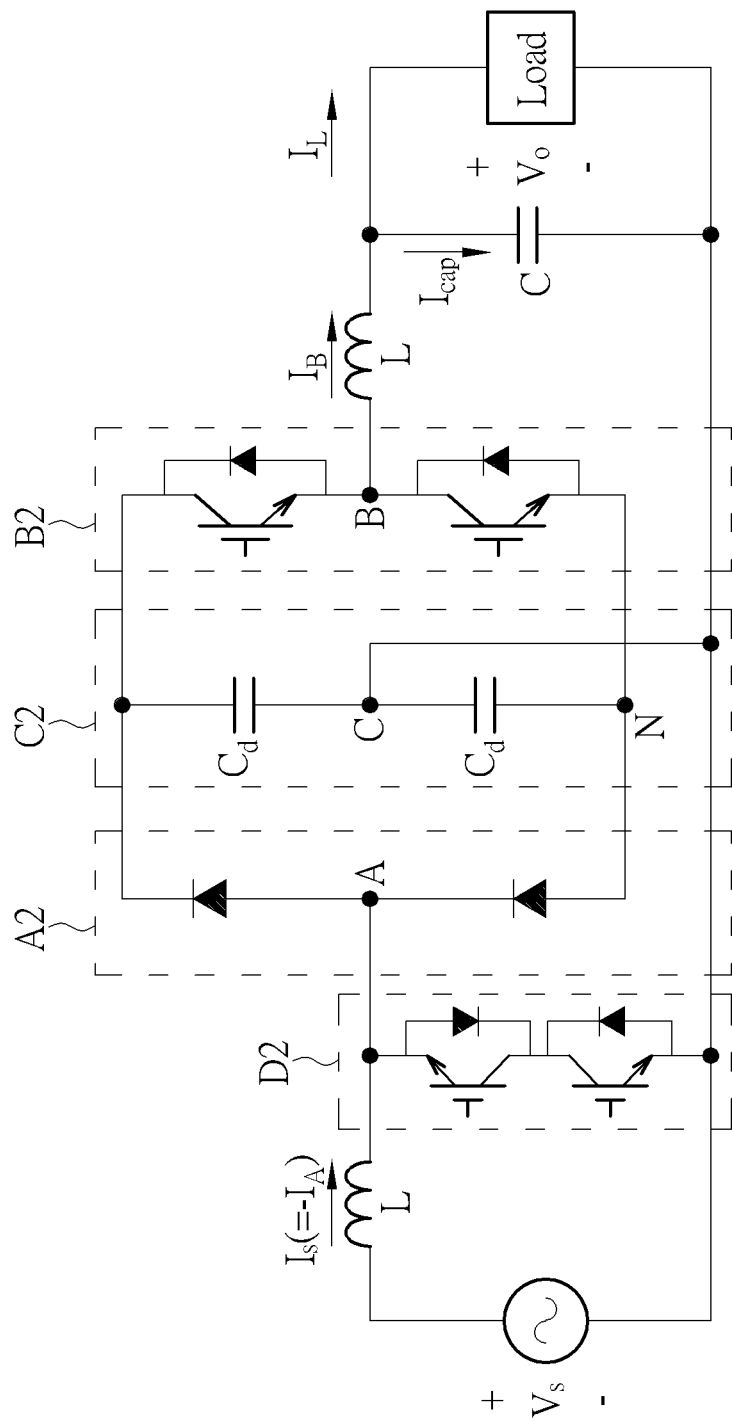
FIG. 2 is a schematic diagram of a conventional rectifier and inverter with no-bridge scheme according to the prior art.
Figure 3:
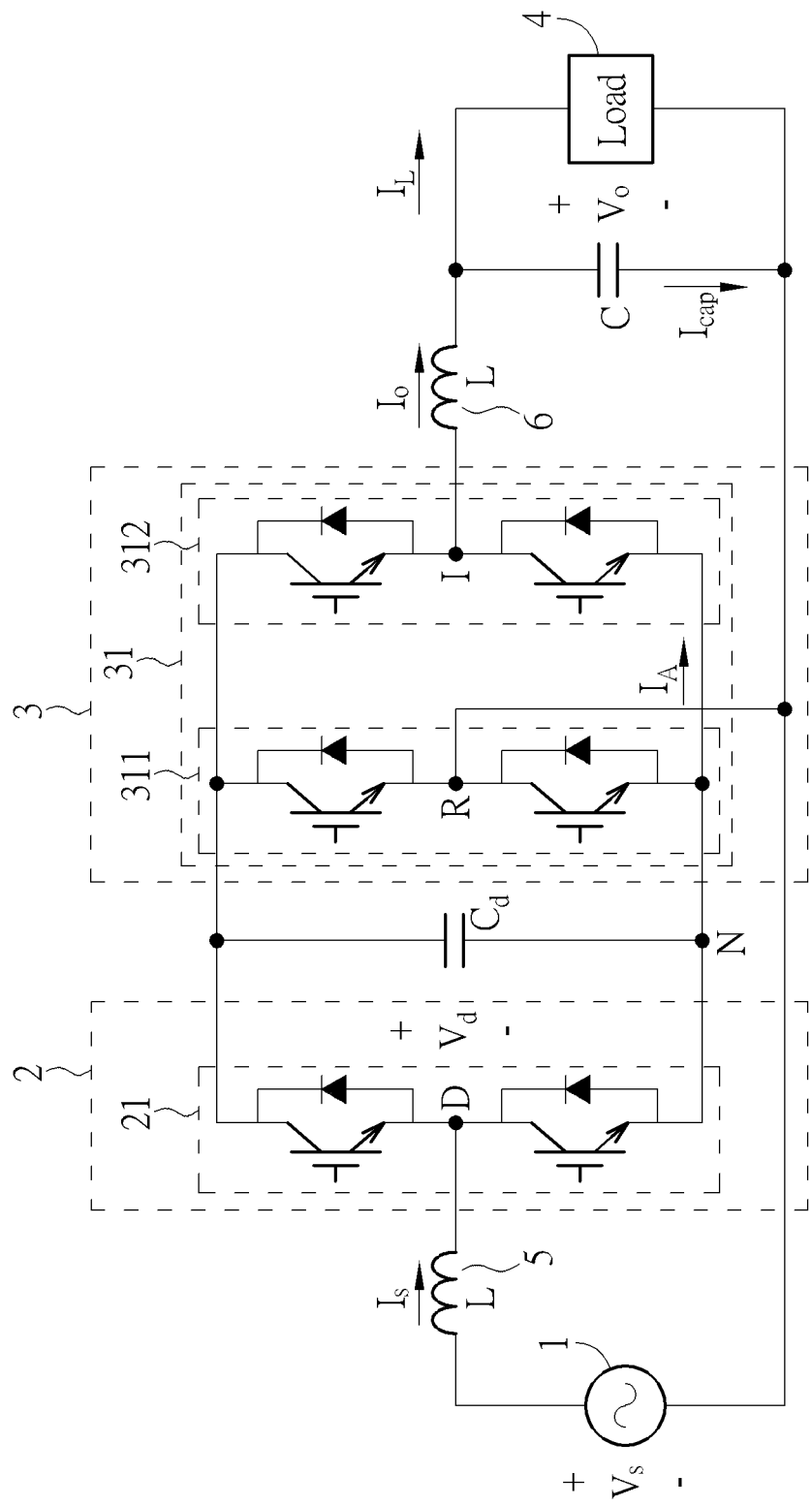
FIG. 3 is a schematic diagram of a three arm rectifier and inverter circuit according to an embodiment of the present invention.

Please refer to FIG. 3, which is a schematic diagram of a three arm rectifier and inverter circuit according to an embodiment of the present invention. The three arm rectifier and inverter circuit includes an input end 1, a rectifier circuit 2 and an inverter circuit 3. The input end 1 is utilized for inputting an input voltage and an input current. The rectifier circuit 2 includes a low frequency switching arm 21. The low frequency switching arm 21 is coupled to the input end 1 for receiving the input voltage and the input current and generating a trigger signal. The inverter circuit 3 includes a full bridge switch 31. The full bridge switch 31 is coupled to the low frequency switching arm 21 for receiving the trigger signal and adjusting an output voltage according to the trigger signal.

In a preferred embodiment, the full bridge switch 31 includes a rectifier arm 311 and an inverter arm 312. A combination of the rectifier arm 311 and the inverter arm 312 employs sinusoidal pulse width modulation (PWM) switching technique. The rectifier arm 311 is coupled to the low frequency switching arm 21 for receiving the trigger signal and accordingly adjusting the input voltage and the input current. A first terminal of the inverter arm 312 is coupled to the rectifier arm 311 and a second terminal of the inverter arm 312 is coupled to a load 4. The inverter arm 312 is utilized for adjusting the output voltage. In an alternative preferred embodiment, the three arm rectifier and inverter circuit further includes a first inductor 5 and a second inductor 6. A first terminal of the first inductor 5 is coupled to the input end 1 and a second terminal of the first inductor 5 is coupled to the low frequency switching arm 21. A first terminal of the second inductor 6 is coupled to the full bridge switch 21 and a second terminal of the second inductor 6 is coupled to the load 4.

As shown in FIG. 3, the three arm rectifier and inverter circuit can be described as the following equation:

$$L\frac{dI_s}{dt} = V_s - V_{DN} + V_{RN} \quad (1)$$

$$L\frac{dI_o}{dt} = V_{IN} - V_{RN} - V_o \quad (2)$$

Where L represents inductance, $I_s$ represents the input current, $I_o$ represents the output current, $V_s$ represents the input voltage, $V_o$ represents the output voltage. Suppose a voltage $V_{DN}$ between nodes D and N of the low frequency switching arm 21 is decided based on the conducting state of the low frequency switch. The conducting state of the low frequency switch is synchronized with the voltage of the mains power (also called grid power) voltage. After the low frequency switching arm 21 receives the input voltage and the input current, the low frequency switching arm 21 performs an upper arm trigger operation during a positive half cycle and performs a lower arm trigger operation during a negative half cycle. Equation (1) can be rewritten as follows:

$$L\frac{dI_s}{dt} = V_s - \left[\frac{1}{2} + \frac{\text{sign}(V_s)}{2}\right]V_d + V_{RN} \quad (3)$$

Where sign( ) is a function, when the input voltage $V_s$ is positive, sign $(V_s)=+1$, and when the input voltage $V_s$ is negative, sign $(V_s)=-1$. The full bridge switch 31 employs the sinusoidal PWM switching technique. An output voltage $V_{RN}$ of the rectifier arm 311 and an output voltage $V_{IN}$ of the inverter arm 312 can be expressed as follows:

$$V_{RN} = \left(\frac{1}{2} + \frac{v_{conR}}{2v_{tm}}\right)V_d \quad (4\text{-}1)$$

$$V_{IN} = \left(\frac{1}{2} + \frac{v_{conI}}{2v_{tm}}\right)V_d \quad (4\text{-}2)$$

Where $v_{tm}$ represents the amplitude of a PWM triangle wave, $v_{conR}$ and $v_{conI}$ represent the control voltage of the rectifier arm 311 and the inverter arm 312 respectively. By substituting equation (4-1) and equation (4-2) into equation (2), the following equation is obtained:

$$L\frac{dI_s}{dt} = V_s - \left[\frac{1}{2} + \frac{\text{sign}(V_s)}{2}\right]V_d + k_{pwm}v_{conR} \quad (5)$$

Where $$k_{pwm} = \frac{V_d}{v_{tm}} \quad (6)$$

$k_{pwm}$ can be regarded as a gain of PWM converter. Further, by adding equation (2) to equation (5) and substituting the control voltages of equation (4-1) and equation (4-2), the following equation is obtained:

$$L\left(\frac{dI_s}{dt} + \frac{dI_o}{dt}\right) = k_{pwm}v_{conI} - \frac{\text{sign}(V_s)}{2}V_d - V_o + V_s \quad (7)$$

Figure 4:
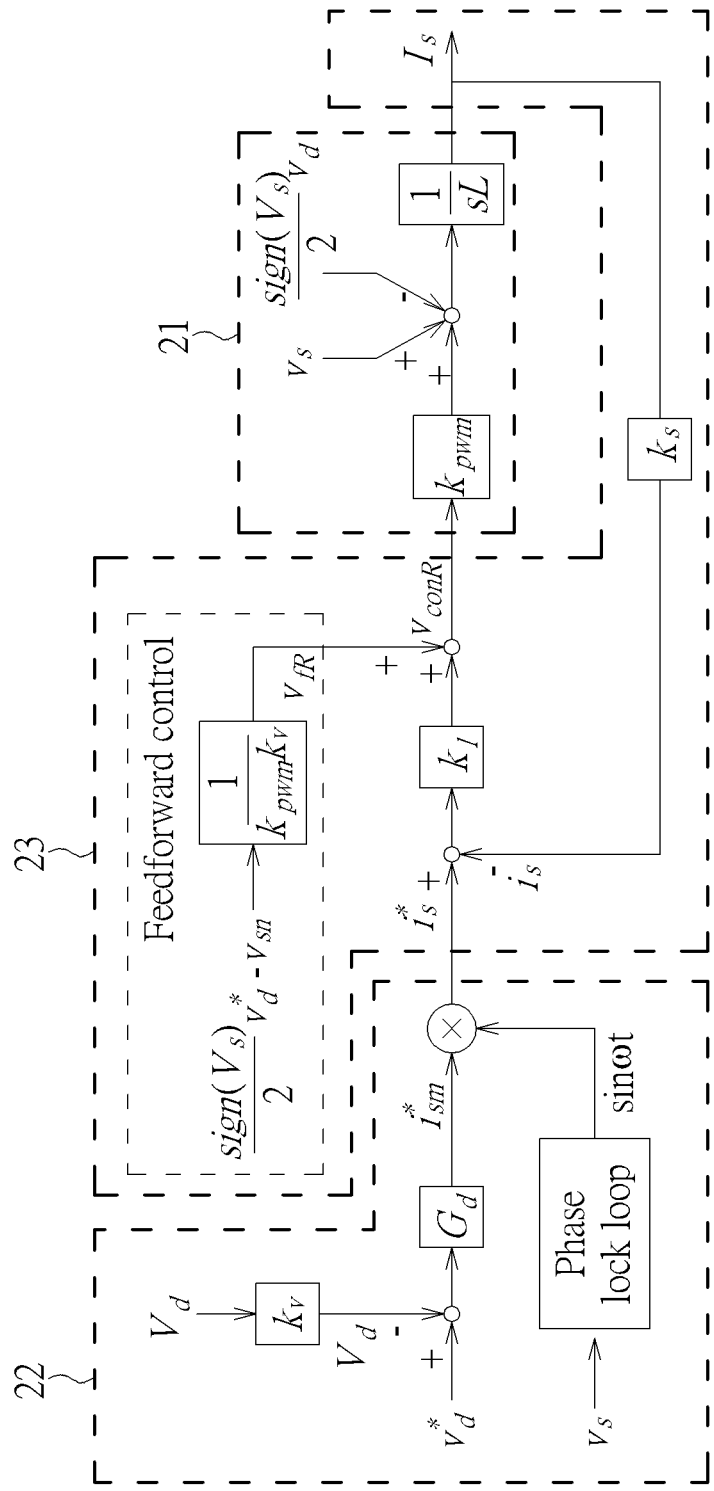
FIG. 4 is a schematic diagram illustrating the control circuit of the rectifier circuit shown in FIG. 3 according to an embodiment of the present invention.

Further, please refer to FIG. 4. FIG. 4 is a schematic diagram illustrating the control circuit of the rectifier circuit 2 shown in FIG. 3 according to an embodiment of the present invention. As shown in FIG. 4, the rectifier circuit 2 includes a low frequency switching arm 21, a first current control circuit 22 and a first voltage control circuit 23. The low frequency switching arm 21 is drawn according to equation (5). The first current control circuit 22 and the first voltage control circuit 23 are the control circuit of the rectifier circuit 2. The first current control circuit 22 employs both a feed forward control and a feedback control. The first current control circuit includes a feed forward control signal $v_{fR}$ and the feed forward control signal feed $v_{fR}$ utilizes a normal value $v_{sn}$ of the input voltage and a disturbance value $\text{sign}(V_s)v_d*/2$ of the input voltage to eliminate a first disturbance of $V_s$ and $\text{sign}(V_s)v_d/2$ in the low frequency switching arm 21. Since the feed forward control signal $v_{fR}$ can eliminate the first disturbance of $V_s$ and $\text{sign}(V_s)v_d/2$ of the low frequency switching arm 21, a current feedback controller $k_1$ merely employs a proportional control. According to FIG. 4, a response of that the first input current tracks the current command can be derived as follows:

$$\frac{i_s}{i_s^*} = \frac{\frac{k_{pwm}k_sk_1}{L}}{s + \frac{k_{pwm}k_sk_1}{L}} = \frac{u_R}{s + u_R} \quad (8)$$

Where $k_s$ and $k_v$ represent a current sensing proportion and a voltage sensing proportion respectively, $i_s$ represents an input current feedback value, the input current feedback value $i_s$ is produced by passing the input current $I_s$ through the current sensing proportion $k_s$, $u_R$ (rad/s) is equivalent to the bandwidth of the current control loop and $u_R$ can be set by using a control gain $k_1$.

The first voltage control circuit 23 employs a feedback control. The first voltage control circuit 23 utilizes a first direct current voltage controller $G_d$ to receive an error (difference) between a direct current voltage command $v_d*$ and a direct current voltage feedback value $v_d$ to generate an input current amplitude command is $i_{sm}*$. A synchronous sinusoidal signal sin ωt is obtained by passing the input voltage $V_s$ through a phase locked loop. An input current command $i_s*$ value is produced by multiplying the input current amplitude command $i_{sm}*$ with the synchronous sinusoidal signal sin ωt. Since the DC voltage may include secondary ripple ($2f_0$), the first direct current voltage controller (Gd) can be designed to make the voltage loop bandwidth much lower than the secondary frequency for attenuating the secondary voltage ripple and achieving low input current distortion.

Figure 5:
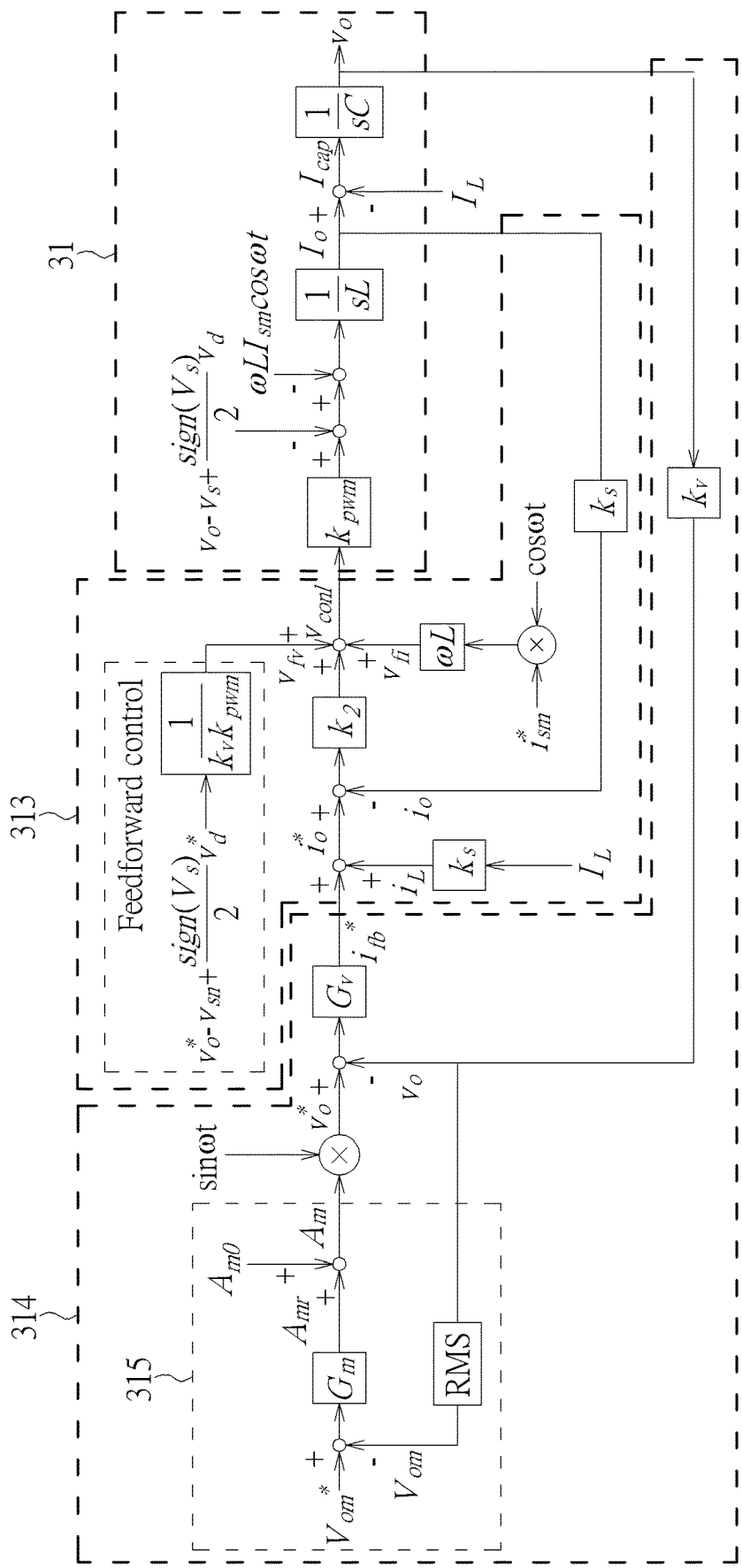
FIG. 5 is a schematic diagram illustrating the control circuit of the inverter circuit shown in FIG. 3 according to an embodiment of the present invention.

Moreover, please refer to FIG. 5. FIG. 5 is a schematic diagram illustrating the control circuit of the inverter circuit 3 shown in FIG. 3 according to an embodiment of the present invention. As sown in FIG. 5, the inverter circuit 3 includes a full bridge switch 31, a second current control circuit 313 and a second voltage control circuit 314. As shown in FIG. 3, an output capacitor C can be described as the following equation:

$$C\frac{dV_o}{dt} = I_o - I_L \quad (9)$$

Therefore, equation (7) can be rewritten as follows:

$$L\frac{dI_o}{dt} = k_{pwm}v_{conI} - \frac{\text{sign}(V_s)}{2}V_d - V_o + V_s - L\frac{dI_s}{dt} \quad (10)$$

Under operating with unity power factor control, the input current $I_s$ is a pure sine wave. Therefore, equation (10) can be rewritten as follows: (10)

$$L\frac{dI_o}{dt} = k_{pwm}v_{conI} - \frac{\text{sign}(V_s)}{2}V_d - V_o + V_s - \omega LI_{sm}\cos\omega t \quad (11)$$

Where $I_{sm}$ represents the amplitude of the input current, ω represents the angular frequency of the input voltage. A circuit model of the full bridge switch 31 can be drawn according to equation (9) and equation (10). The inverter circuit 3 employs double loop control. The outer loop is the second voltage control circuit 314. The inner loop is the second current control circuit 313.

The second current control circuit 313 employs both the feed forward control and the feedback control. The second current control circuit 313 includes a feed forward voltage signal $v_{fv}$ and a feed forward current signal $v_{fi}$. The feed forward voltage signal $v_{fv}$ utilizes an output voltage command $v_o$, a normal value $v_{sn}$ of the input voltage and a disturbance value $\text{sign}(V_s)v_d*/2$ of the input voltage to eliminate a second disturbance of $V_o$, $V_s$ and $\text{sign}(V_s)V_d/2$ in the full bridge switch 31. The feed forward current signal $v_{fi}$ is produced by multiplying the input current amplitude command $i_{sm}*$ with the synchronous sinusoidal signal sin ωt and passing through an inductor with an angular frequency ωL to eliminate a third disturbance of $\omega LI_{sm}$ cos ωt in the full bridge switch 31. By using above feed forward control, a current feedback controller $k_2$ can merely employ a proportional control $k_2$. According to FIG. 5, a response of that the second input current tracks the current command can be derived as follows:

$$\frac{i_o}{i_o^*} = \frac{\frac{k_{pwm}k_sk_2}{L}}{s + \frac{k_{pwm}k_sk_2}{L}} = \frac{u_I}{s + u_I} \quad (12)$$

Where $i_o^*$ represents an output current command, the output current command $i_o^*$ is produced by adding an output current compensation command $i_{fb}^*$ generated by the voltage loop to an inductor current feedback value $i_L$, the inductor current feedback value $i_L$ is produced by passing an inductor current $I_L$ through the current sensing proportion $k_s$, $i_o$ represents an output current feedback value, the output current feedback value $i_o$ is produced by passing the output current $I_o$ through the current sensing proportion $k_s$, and $u_I$ can be regards as the bandwidth of the current control loop.

The second voltage control circuit 314 employs a feedback control. For improving the voltage regulation rate, the second voltage control circuit 314 includes a root mean square value control circuit 315. The root mean square value control circuit 315 calculates a root mean square value $v_{om}$. The root mean square value $v_{om}$ is compared to a root mean square value command $v_{om}^*$, and the comparison result is provided to a second direct current voltage controller $G_m$. The second direct current voltage controller $G_m$ receives the comparison result and accordingly generates an amplitude correction command $A_{mr}$ for correcting an original amplitude command $A_{m0}$ to obtain a voltage amplitude command $A_m$. The voltage amplitude command $A_m$ is multiplied with the synchronous sinusoidal signal sin $\omega t$ to obtain an instantaneous voltage command $v_o^*$. The inverter circuit 3 includes a third direct current voltage controller $G_v$. The third direct current voltage controller $G_v$ receives an error (difference) between an instantaneous voltage command $v_o^*$ and the direct current feedback value $v_o$ and generates the output current compensation command $i_{fb}^*$.

Figure 6:
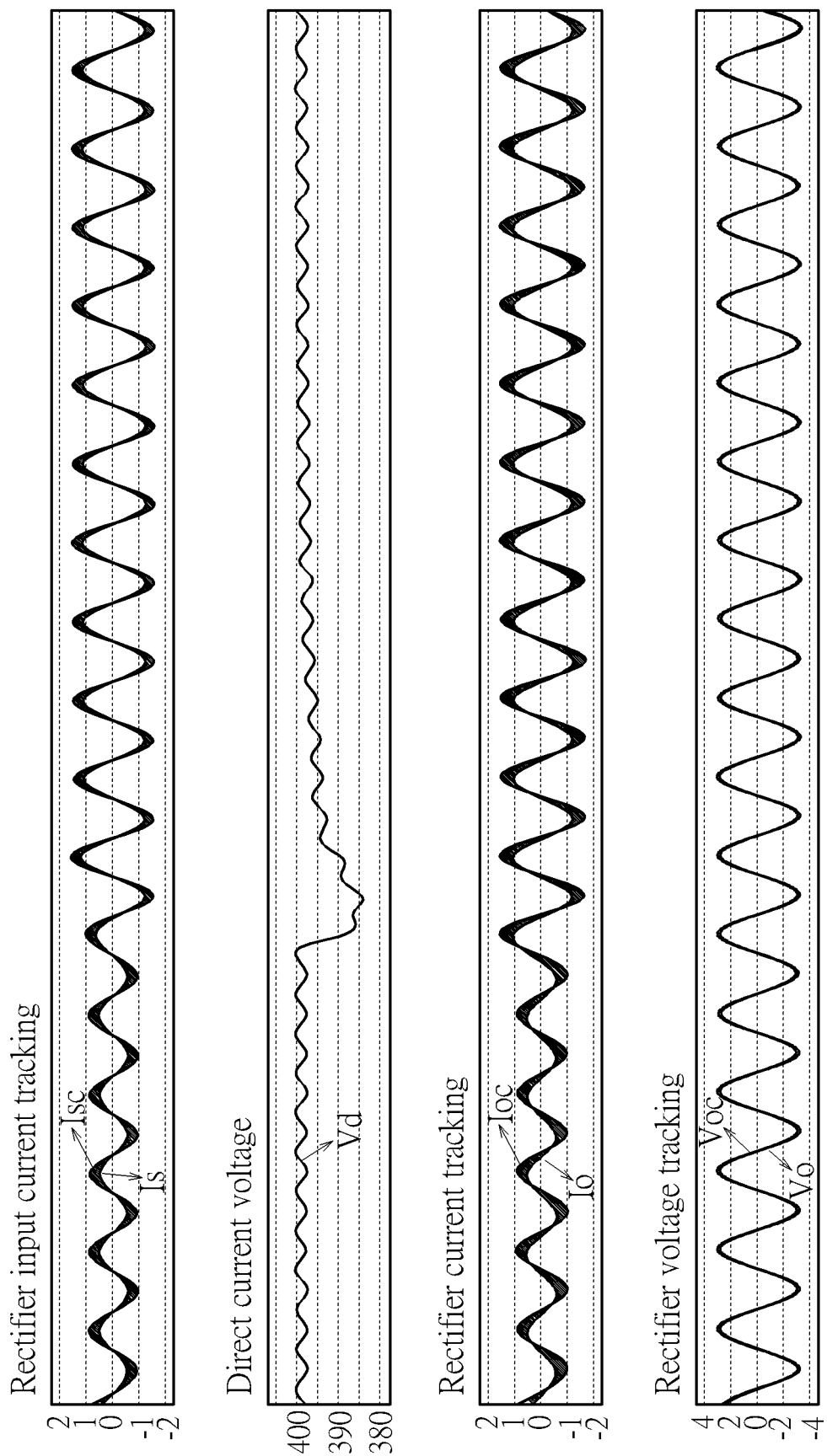
FIG. 6 is a waveform diagram illustrating response waveform of the three arm rectifier and inverter circuit shown in FIG. 3 with the resistive load varying from 500 W to 1 kW according to an embodiment of the present invention.
Figure 7:
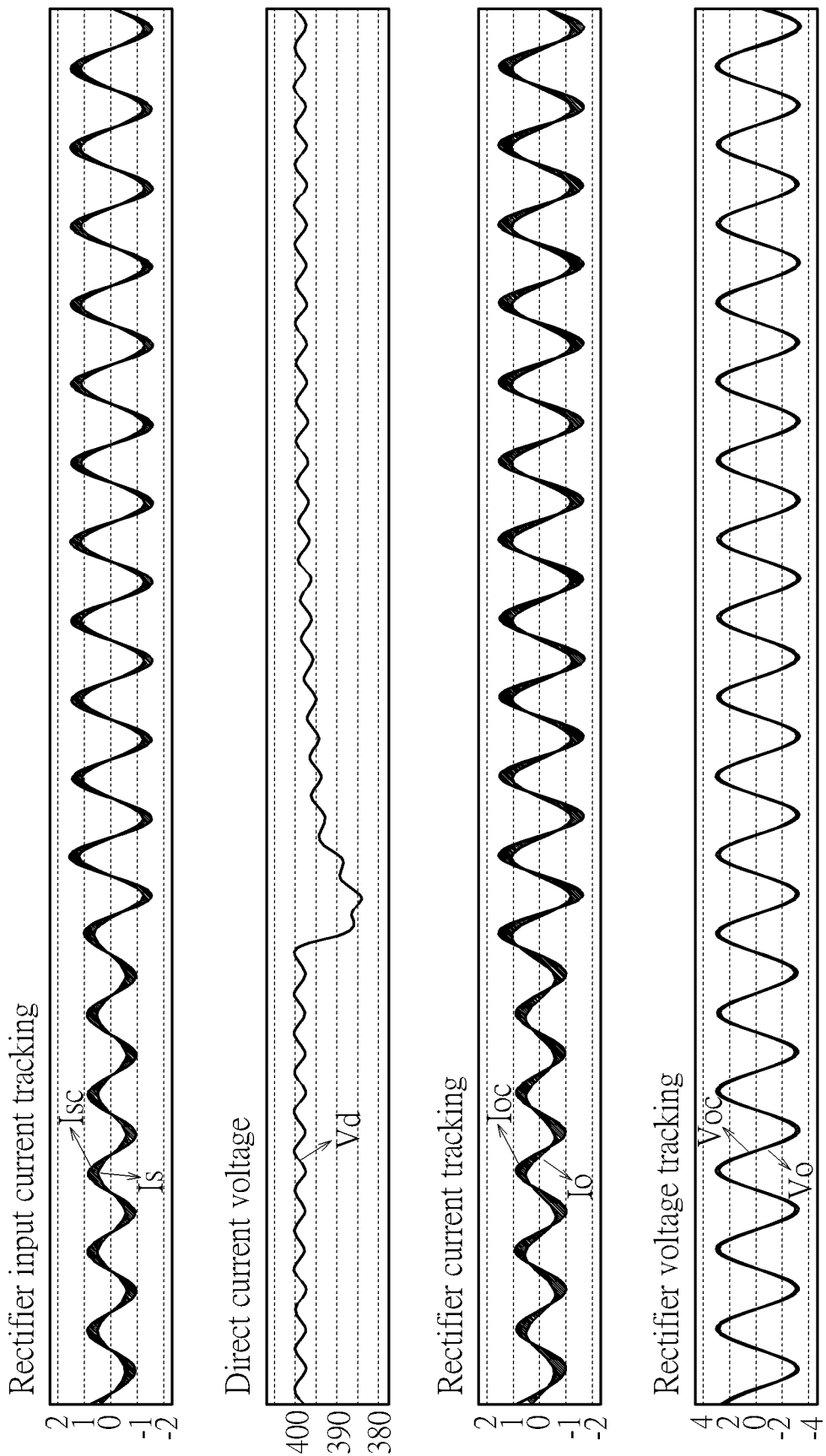
FIG. 7 is a waveform diagram illustrating response waveform of the three arm rectifier and inverter circuit shown in FIG. 3 with the R-C-D load (100 Ω+68 uF) according to an embodiment of the present invention.

Moreover, please refer to FIG. 6 and FIG. 7. FIG. 6 is a waveform diagram illustrating response waveform of the three arm rectifier and inverter circuit shown in FIG. 3 with the resistive load varying from 500 W to 1 kW according to an embodiment of the present invention. FIG. 7 is a waveform diagram illustrating response waveform of the three arm rectifier and inverter circuit shown in FIG. 3 with the R-C-D load (100 Ω+68 uF) according to an embodiment of the present invention. As shown in FIG. 6, FIG. 6 shows the waveform while the resistive load varies from 500 W to 1 kW. The input current $I_s$ inputted to the rectifier circuit 2 can close track the response of the command $I_{sc}$ so as to verify the effectiveness of the current controller. The direct current voltage $V_d$ can also maintain at 400V accurately and quickly return to 400V under the load change, thus achieving excellent dynamic response and verifying the effectiveness of the direct current voltage control loop. Besides, the input current $I_o$ inputted to the inverter circuit 3 can close track the response of the command $I_{oc}$ so as to verify the effectiveness of the current controller. Further, the output voltage $V_o$ can close track the response of the command $V_{oc}$, and the waveforms almost overlap to the same waveform, thus achieving low output impedance purpose.

As shown in FIG. 7, FIG. 7 shows the response waveform under the R-C-D load (100 Ω+68 uF). Although the current distortion is severe under the influence of the R-C-D load, the input current is quite close to the sine wave after being compensated by the current of the rectifier arm 311, thus verifying the function of active filter for the rectifier arm 311. The direct current voltage $V_d$ can also maintain at 400V accurately. Similarly, the waveforms almost overlap to the same waveform, thus achieving low output impedance purpose.

In summary, since the input voltage and the output voltage of the invention structure employ the same common neutral, the invention can merely use a single capacitor and the direct current voltage merely needs to be higher than the peak value of the input voltage. When the input voltage is interrupted and the direct current link is connected to the direct current power supply, the full bridge can continue to provide the load voltage. In addition, the current of the rectifier arm 311 is a difference between the input current and the load current. Under the condition of PFC (power factor correction), it is only necessary to retain the reactive power of the load, the harmonic current and the small amount of real power component of the compensation inverter, such that the conduction loss of the invention is less than the conventional architecture. Moreover, the embodiments of the invention employ the low frequency switching control method synchronized with the mains power so as to reduce the switching loss.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A three arm rectifier and inverter circuit, comprising:
an input end for inputting an input voltage and an input current;
a rectifier circuit comprising a low frequency switching arm, wherein the low frequency switching arm is coupled to the input end for receiving the input voltage and the input current and generating a trigger signal; and
an inverter circuit comprising a full bridge switch, wherein the full bridge switch is coupled to the low frequency switching arm for receiving the trigger signal and adjusting an output voltage, wherein the inverter circuit further comprises:
a first current control circuit comprising a feed forward voltage signal and a feed forward current signal, wherein the feed forward voltage signal utilizes an output voltage command, a normal value of the input voltage and a disturbance value of the input voltage to eliminate a first disturbance of the full bridge switch, and the feed forward current signal is produced by multiplying an input current amplitude command with a synchronous sinusoidal signal and passed through an inductor with an angular frequency to eliminate a second disturbance of in the full bridge switch.

2. The three arm rectifier and inverter circuit of claim 1, wherein the full bridge switch comprises:
a rectifier arm, wherein the rectifier arm is coupled to the low frequency switching arm for receiving the trigger signal and adjusting the input voltage and the input current; and
an inverter arm, wherein a first terminal of the inverter arm is coupled to the rectifier arm and a second terminal of the inverter arm is coupled to a load, for adjusting the output voltage.

3. The three arm rectifier and inverter circuit of claim 1, further comprising:
a first inductor, wherein a first terminal of the first inductor is coupled to the input end and a second terminal of the first inductor is coupled to the low frequency switching arm; and
a second inductor, wherein a first terminal of the second inductor is coupled to a full bridge switch and a second terminal of the second inductor is coupled to a load.

4. The three arm rectifier and inverter circuit of claim 1, wherein after receiving the input voltage and the input current, the low frequency switching arm performs an upper arm trigger operation during a positive half cycle and performs a lower arm trigger operation during a negative half cycle.

5. The three arm rectifier and inverter circuit of claim 1, wherein the rectifier circuit comprises:
   a second current control circuit, wherein the second current control circuit comprises a feed forward control signal, the feed forward control signal utilizes a normal value and the disturbance value of the input voltage to eliminate a third disturbance of the low frequency switching arm; and
   a first voltage control circuit, wherein the first voltage control circuit utilizes a first direct current voltage controller to receive a difference between a direct current voltage command and a direct current voltage feedback value to generate an input current amplitude command, wherein first voltage control circuit generates an input current command by multiplying the input current amplitude command with a synchronous sinusoidal signal.

6. The three arm rectifier inverter circuit of claim 1, wherein the inverter circuit comprises:
   a second voltage control circuit, wherein the second cur voltage control circuit comprises a root mean square value control circuit, and the root mean square value control circuit 315 calculates a root mean square value of the output voltage.

7. The three arm rectifier inverter circuit of claim 6, wherein the root mean square value is compared to a root mean square value command and the comparison result is provided to a second direct current voltage controller, the second direct current voltage controller receives the comparison result and accordingly generates an amplitude correction command for correcting an original amplitude command to obtain a voltage amplitude command, and the voltage amplitude command is multiplied with a synchronous sinusoidal signal to obtain an instantaneous voltage command.

8. The three arm rectifier and inverter circuit of claim 1, wherein the inverter circuit comprises:
   a third direct current voltage controller, where the third direct current voltage controller receives a difference between an instantaneous voltage command and a direct current feedback value and accordingly generates an output current compensation command.

* * * * *